(12) United States Patent
Zwillinger

(10) Patent No.: US 12,732,229 B2
(45) **Date of Patent: *Sep. 8, 2026**

(54) MOVEMENT INITIATED AUTOMATED INFORMATION TRANSFER

(71) Applicant: Daniel Ian Zwillinger, Newton, MA (US)

(72) Inventor: Daniel Ian Zwillinger, Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/329,770

(22) Filed: Sep. 16, 2025

(65) Prior Publication Data

US 2026/0019106 A1 Jan. 15, 2026

Related U.S. Application Data

(60) Continuation-in-part of application No. 19/067,916, filed on Mar. 2, 2025, now Pat. No. 12,425,073, which is a division of application No. 18/214,592, filed on Jun. 27, 2023, now Pat. No. 12,284,001.

(51) Int. Cl.
*H04B 5/72* (2024.01)
*H04B 1/3827* (2015.01)

(52) U.S. Cl.
CPC ............... *H04B 5/72* (2024.01); *H04B 1/385* (2013.01); *H04B 2001/3861* (2013.01)

(58) Field of Classification Search
CPC ... H04B 5/72; H04B 1/385; H04B 2001/3861
USPC ........................................................ 455/41.1
See application file for complete search history.

(56) References Cited

U.S. PATENT DOCUMENTS 8,219,028 B1 * 7/2012 Flamholz ............. G06F 1/1694 455/41.2
12,425,073 B2 * 9/2025 Zwillinger ............... H04B 5/72
2015/0289112 A1 * 10/2015 Gilbert .................. H04W 4/027 455/404.2

* cited by examiner

*Primary Examiner* — Eugene Yun

(57) ABSTRACT

A method for information transfer comprising determining a signed magnitude value of a first and second movement vectors corresponding to movements of the devices. Each value is assigned a positive or a negative sign based on direction of the movement with respect to direction of gravity. Real number values of the signed magnitude values are compared on fulfillment of one or more conditions. A position of the first device is defined as an above position relative to the second device if the real number value corresponding to the first movement vector is found to be smaller than the signed magnitude value corresponding to the second movement vector, the signed magnitude value being assigned a negative sign when the direction of the movement is substantially along the direction of gravity and assigned a positive sign when the movement is opposite to the direction of gravity.

18 Claims, 7 Drawing Sheets

102A
202
$V_A$ = - 5 cm/s
102B
$V_B$ = 10 cm/s
204
102A
102B

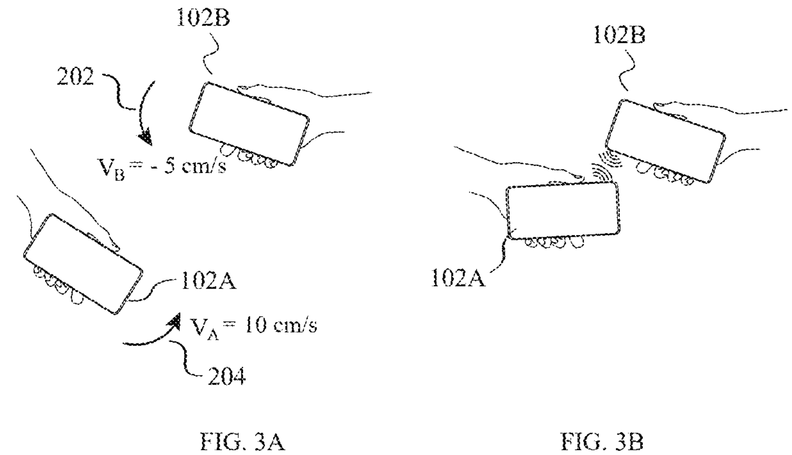
FIG. 3A
FIG. 3B
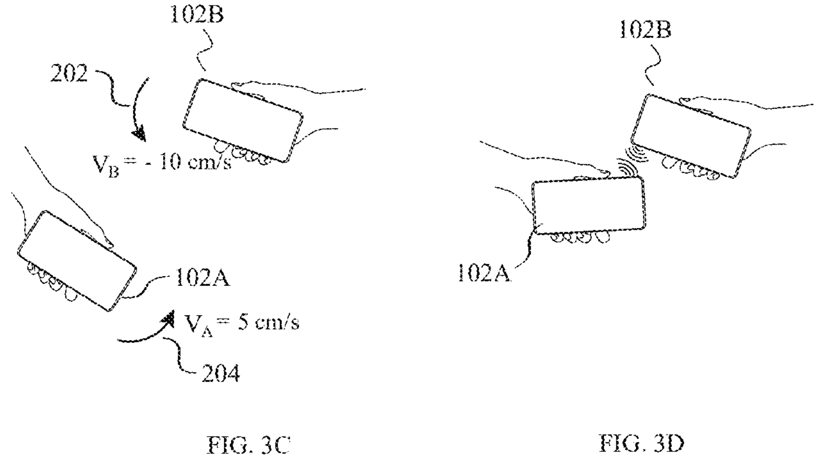
FIG. 3C
FIG. 3D

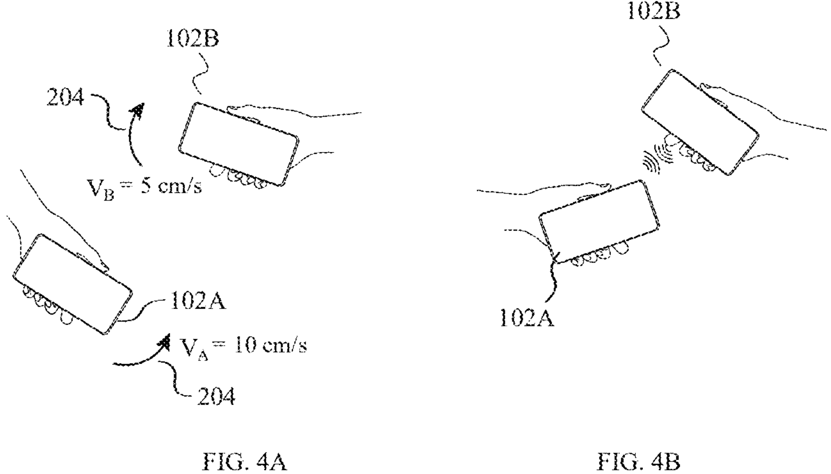
FIG. 4A
FIG. 4B
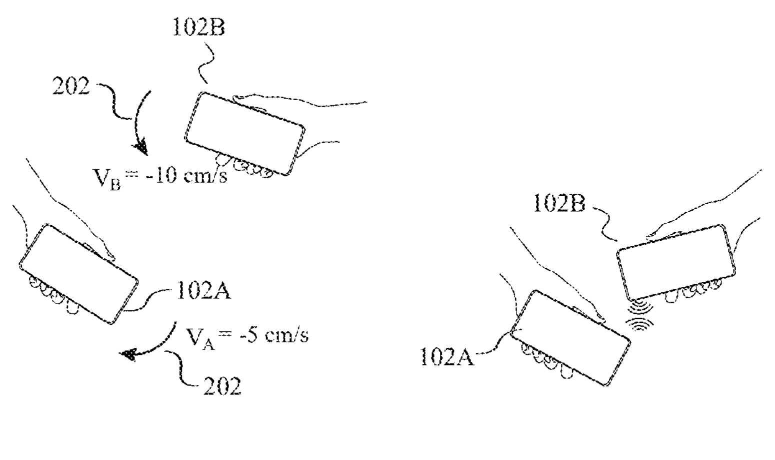
FIG. 4C
FIG. 4D

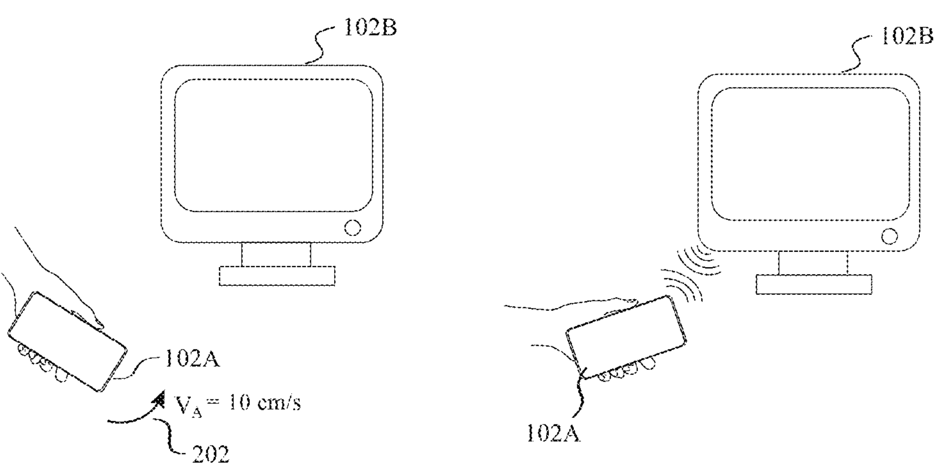
FIG. 5A
FIG. 5B
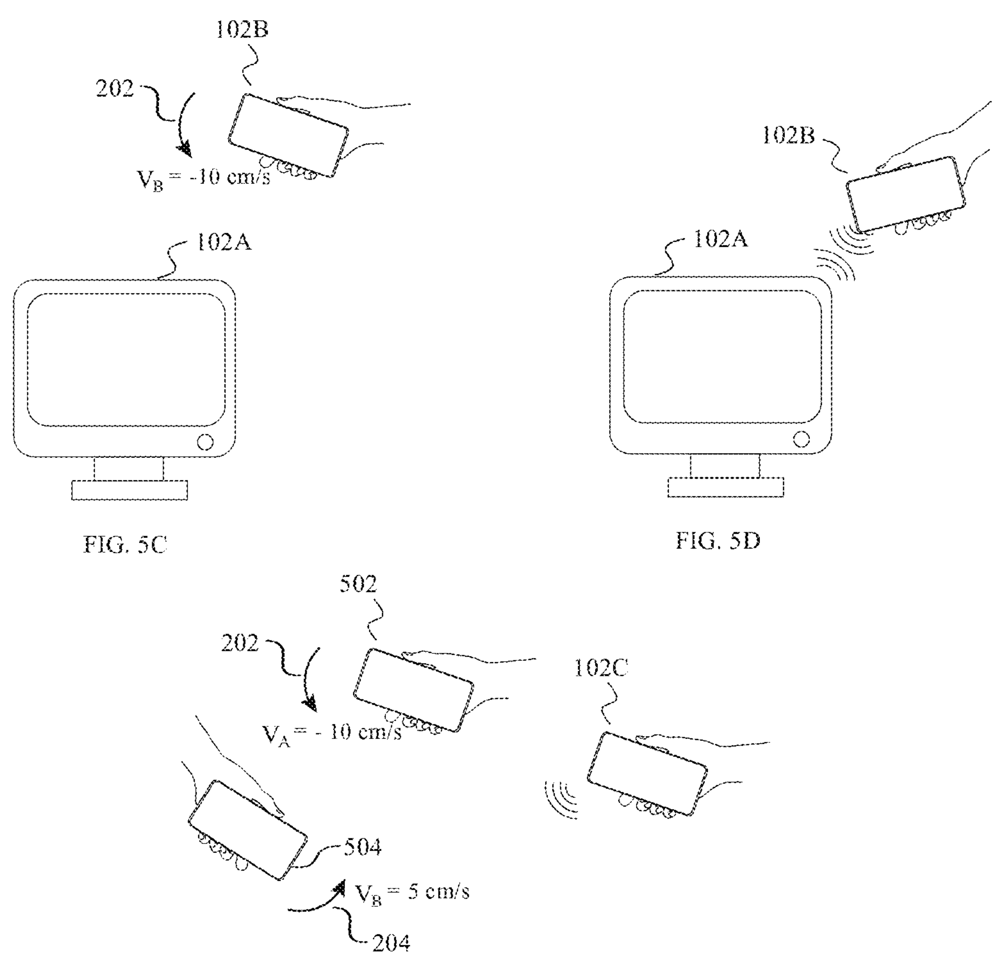
FIG. 5C
FIG. 5D
FIG. 5E

| | Actions to be taken by a lower device corresponding to updated rules instructions |
|---|---|
| 1 | DOWNLOAD: On next download, download all stored information |
| 2 | DOWNLOAD: Only download data from device (no uploads), until there is a rule change |
| 3 | PASSWORD: Here is the password XXXX, continue normal behavior |
| 4 | PASSWORD: No additional rule updates until the password XXXX is received |
| 5 | RESET: Delete all information on device (e.g., reset to factory specs) |
| 6 | RESET: Delete all information on device 1 hour after last use |
| 7 | RESET: When uploading any new information, delete all previous information |
| 8 | Sleep for the next 6 hours |
| 9 | When downloading to a printer, only download the last document, not the latest WIFI information |

MOVEMENT INITIATED AUTOMATED INFORMATION TRANSFER

CROSS-REFERENCE TO RELATED APPLICATIONS

This application is a continuation-in-part of previously filed, co-pending U.S. patent application Ser. No. 19/067,916 dated Mar. 2, 2025 which is a divisional patent application of U.S. Utility application Ser. No. 18/214,592, filed Jun. 27, 2023, now U.S. patent Ser. No. 12/284,001 dated Apr. 22, 2025, the entire contents of which are incorporated herein by reference.

FIELD OF THE INVENTION

The present invention in general is related to the field of communications. More particularly, the present invention is related to data transfer initiated by relative movements of two devices.

BACKGROUND OF THE INVENTION

Transfer of data between electronic devices often requires multiple user actions on either or both of the devices. Conventionally, such a data transfer may need a number of steps involving user interactions. For example, user inputs may be needed to establish a connection between the devices, to select a direction of data transfer and to grant permission to transmit and receive data etc. Sometimes, for many users those steps may not be easy to follow. If the devices transferring the data have a small physical user interface, which is often the case with mobile devices, the data transfer process becomes even more tedious for the users.

In making the process of transfer of data between two nearby devices easy and quick Near Field Communications (NFC) technology is finding widespread use. This short-range high frequency wireless communications technology exchanges data between devices over a short distance, such as only a few centimeters and use of it can reduce the number of steps required to transfer data. However, NFC by itself does not alleviate the cumbersome user interactions. To this end, methods have been introduced to initiate a data transfer triggered by a physical contact such as a tapping by one device onto another one. However, none of these methods enable users to set the direction of data flow for general purpose devices without interacting with the devices through a user interface. Applicant's parent U.S. patent application Ser. No. 18/214,592, filed Jun. 27, 2023, solves this problem. However, a physical impact between the devices is required for the automated information transfer described in this parent patent application of the applicant.

Thus, there exists a need for a system and method which can overcome the above-mentioned problems associated with instant data transfer.

OBJECT OF THE INVENTION

An object of the present invention is to provide a system and method for instantaneous communication between devices.

Yet another object of the present invention is to provide a system and method for data transfer with minimal user interactions.

Still another object of the present invention is to provide a system and method for communication initiated only by relative movements of devices without any physical contact.

Another object of the present invention is to provide a system and method for setting direction of data transfer without the use of user interface.

Another object of the present invention is to provide a system and method for data transfer in a single step.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The present invention is directed to a system and a method for automated information transfer between two electronic devices. The method comprises determining a signed magnitude value of a first movement vector and a second movement vector corresponding to a movement of a first device and a second device respectively. The signed magnitude value is assigned a positive sign or a negative sign based on a direction of the movement of the device(s) with respect to the direction of gravity. For example, the signed magnitude value is assigned a negative sign when the direction of the movement is substantially along the direction of gravity and assigned a positive sign when the direction of the movement is substantially opposite to the direction of gravity. The signed magnitude values corresponding to the movement of the devices are then compared, if certain conditions are fulfilled, based on their real number values. One of such conditions is that the devices have to remain within a predefined proximity to each other while being moved for the comparison of the movement vectors. Another condition may be that the movement of the device occurs at least for a predefined period of time and at least one of the devices move at a speed greater than a predefined value. Another condition may be that only the movements falling within a predefined angular zone defined with respect to the direction of gravity are considered for the comparison of their signed magnitude values.

Once the one or more conditions are fulfilled, a comparison is carried out between the real number values of the signed magnitude values of the movement vectors. This step can be executed in any one of the devices, in both the devices or in a third device. Depending on the result of the comparison, the relative positions of the devices are defined as above and below of each other. For example, the position of the first device is defined as above position relative to the second device if the real number value of the signed magnitude value corresponding to the first movement vector is found to be smaller than that of the signed magnitude value corresponding to the second movement vector.

At least one of the devices comprises a processor and a non-transitory machine-readable storage medium having a set of data and a set of rules stored therein which, when executed by the processor, configures the device(s) to take one or more actions. One of such actions is wirelessly transmitting the set of data in accordance with the set of rules from the first device to the second device if the position of the first device is defined as above position relative to the second device. The data flow direction can be set in the reverse way also. Another action is to provide feedback to a user by the first device and/or by the second device with respect to the status of receiving or transmitting the set of data. Selection of the data being transmitted from an upper device to a lower device happens automatically based on the set of rules. The rules may be based on a type of the set of data, a type of the upper and lower devices, time of the movement of the devices and a sequence of the movement etc.

The first and second devices then get configured automatically to wirelessly communicate a set of data based on the relative positions of the devices with respect to each other without requiring any further input from users.

BRIEF DESCRIPTION OF DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which:

FIG. 3A illustrates an exemplary scenario of a second device moving downward in the direction of gravity with a speed lower than that of a first device moving upward opposite to the direction of gravity;

FIG. 3B illustrates an exemplary scenario of the first device communicating with the second device as a result of the movements shown in FIG. 3A in accordance with an embodiment of the present invention;

FIG. 3C illustrates an exemplary scenario of a second device moving downward in the direction of gravity with a speed greater than that of a first device moving upward opposite to the direction of gravity;

FIG. 3D illustrates an exemplary scenario of the first device communicating with the second device as a result of the movements shown in FIG. 3C in accordance with an embodiment of the present invention;

FIG. 4A illustrates an exemplary scenario of a first device and a second device moving in the same upward direction opposite to the direction of gravity with the first device having a speed greater than that of the second device;

FIG. 4B illustrates an exemplary scenario of the first device communicating with the second device as a result of the movements shown in FIG. 4A in accordance with an embodiment of the present invention;

FIG. 4C illustrates an exemplary scenario of a first device and a second device moving in the same downward direction along the direction of gravity with the second device having a speed greater than that of the first device;

FIG. 4D illustrates an exemplary scenario of the first device communicating with the second device as a result of the movements shown in FIG. 4C in accordance with an embodiment of the present invention;

FIG. 5A illustrates an exemplary scenario of a first device moving upward opposite to the direction of gravity toward a stationary second device;

FIG. 5B illustrates an exemplary scenario of the first device communicating with the second device as a result of the movement shown in FIG. 5A in accordance with an embodiment of the present invention;

FIG. 5C illustrates an exemplary scenario of a second device moving downward in the direction of gravity toward a stationary first device;

FIG. 5D illustrates an exemplary scenario of the first device communicating with the second device as a result of the movement shown in FIG. 5C in accordance with an embodiment of the present invention;

FIG. 5E illustrates an exemplary scenario of a third device measuring and/or comparing the movement vectors corresponding to the movements of the first and second devices in accordance with an embodiment of the present invention;

FIG. 7 illustrates examples of rules update instructions and actions in accordance with an embodiment of the present invention.

DETAILED DESCRIPTION OF THE INVENTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein. Accordingly, it is intended that the present invention covers such modifications and variations as come within the scope of the appended claims and their equivalents.

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Specific embodiments of the present invention are now described with reference to the figures, wherein like reference numbers indicate identical or functionally similar elements. The terms "tap", "knock", "bang", "strike", "hit" and "touch" are the words which can be alternatively used with respect to a physical contact or impact between two or more devices as described here. A physical contact or an impact is considered to cause a sufficient change in a sensor, such as in an accelerometer or in other similar sensors, to detect the change in acceleration. Similarly, the term "movement" is used to refer to a displacement of a device in a certain direction.

Figure 1B:
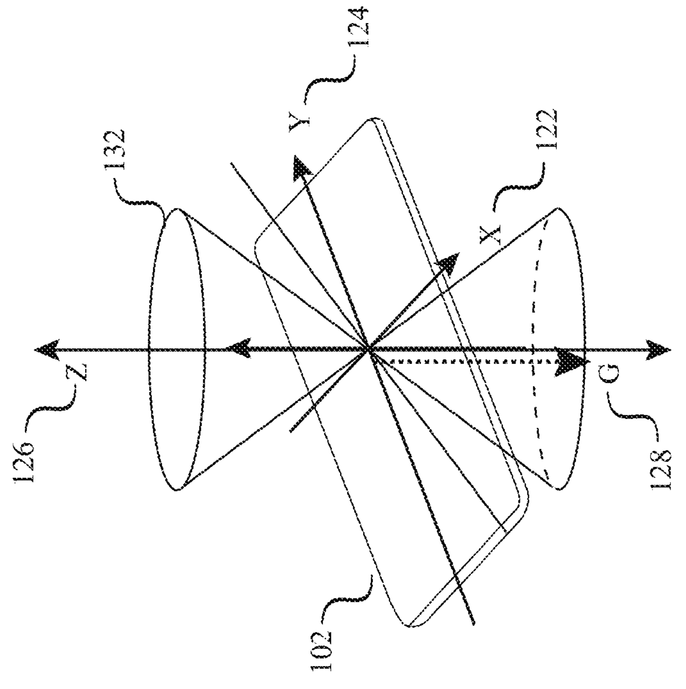
FIG. 1B illustrates three mutually perpendicular lines of a coordinate system shown with respect to a computing device incorporating the present invention.
Figure 1A:
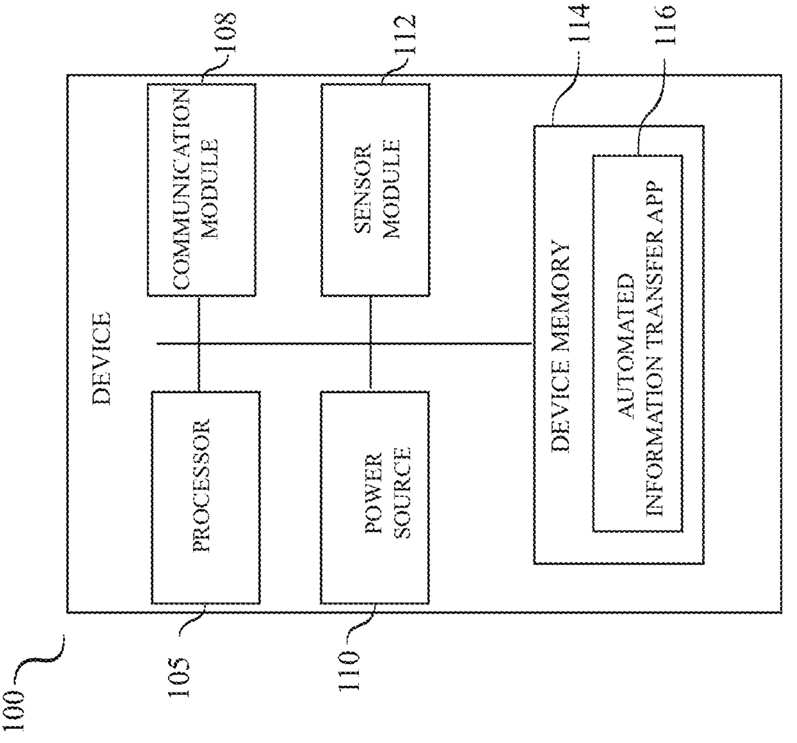
FIG. 1A is a schematic view of a computing device in accordance with an embodiment of the present invention.

FIG. 1A illustrates a schematic diagram of an exemplary computing device 100 which may be implemented in any form of a computing and/or electronic device, and in which embodiments of the methods described above may be implemented. The computing device 100 can be in different forms, such as, for example, a dedicated intermediate device custom made for implementation of the present invention, a mobile phone, a printing device, a personal computer, a portable computing device etc. In devices such as desktop computers, printers, microwave ovens etc. which may not come with factory provided sensors (accelerometers, for example), such devices can be retrofitted with one or more sensors to incorporate the present invention.

The device 100 comprises a processor 105, a communication module 108, a power source 110, an optional sensor module 112 and a device memory 114, all of which are communicatively connected with each other.

Processor 105 can be a microprocessor, controller, application specific integrated circuits (ASICs), programmable logic devices, chipsets, field programmable gate arrays (FPGAs), or any other suitable type of components for processing computer executable instructions to control the operation of the device in order to transfer or receive data as per a set of rules.

The computer executable instructions may be provided using any computer-readable media, such as the memory 114, which may also store any software/application such as the automated information transfer app 116. Memory 114 may include internal tables for data related to a set of rules, for example, or other data structures for receiving, transmitting, maintaining and manipulating data used by application 116. Memory 114 may store data corresponding to simple or complex data structures. The term "computer readable medium" as used herein refers to any medium that participates in providing instructions to the processors for execution. A computer readable medium may take many forms, including but not limited to, non-volatile media, volatile media, and transmission media. Non-volatile media includes, for example, optical, magnetic disks, and magneto-optical disks, such as the hard disk or the removable media drive.

The communication module 108 enables the device 100 to wirelessly communicate with other devices, networks, and/or systems. For example, communication module 108 may include a transmitter and a receiver (or a transceiver) for transmitting and receiving data in compliance with various protocols/technologies such as Near Field Communications (NFC), Wireless Application Protocol (WAP), Ultra Wide-Band (UWB) communication, Bluetooth, Wireless Fidelity (Wi-Fi), Transport Control Protocol/Internet Protocol (TCP/IP), Institute of Electrical and Electronics Engineers (IEEE) 802.X, or any other type of wireless and/or wired protocol or standard.

The optional sensor module 112, in one embodiment, is configured for determining autonomous positioning and/or for acquiring information of a moving object from a distance. Accordingly, the sensor module 112 provides information to determine velocity and orientation of its parent device and/or those of another device corresponding to a movement of the parent device and/or of the other device. The sensor module 112 may include an accelerometer capable of producing a set of readings comprising a plurality of acceleration values with respect to a plurality of axes (axes X, Y and Z, for example) of acceleration corresponding to a movement made by the device 100. The accelerometer may include hardware or a combination of hardware and software for determining an acceleration of the device 100. The accelerometer may be a micro-electromechanical system (MEMS) accelerometer, a piezoelectric accelerometer, or some other type of accelerometer. The sensor module 112 may further include a magnetometer capable of acquiring information as to strengths of magnetic fields in different directions. In some embodiments, sensor module 112 may not comprise the accelerometer and/or the magnetometer and, instead, may include a contact-sensitive sensor (e.g., an electric field sensor, a surface conduction sensor, a pressure/force sensor, a vibration sensitive sensor, etc.) to detect a physical contact. In some embodiments, the sensor module 112 includes a Global Positioning System (GPS) sensor/receiver to provide geolocation, velocity, and time data. For acquiring the movement related data of another device from a distance without making any contact, the sensor module 112 may use methods such as Light Detection and Ranging (LiDAR) etc. In certain embodiments, the magnetometer of the sensor module 112 may be used in determining whether the direction of movement/acceleration is toward the center of Earth or is in the opposite direction. Each of the sensor modules 112 produces a movement vector corresponding to the change in movement experienced by the respective devices. In one embodiment, the movement vector so produced is an acceleration vector comprising a plurality of acceleration values with respect to a plurality of axes of acceleration corresponding to the movement of the device. In another embodiment, the movement vector is a velocity vector comprising a signed magnitude value of the movement.

FIG. 1B illustrates a mobile device 102 incorporating the components of the computing device 100 of the present invention. It also shows a spatial coordinate system comprising X-axis (indicated by 122), Y-axis (indicated by 124) and Z-axis (indicated by 126) with respect to the mobile device 102. Gravity vector "G" indicated by 128 represents the direction of gravity i.e., the direction toward the center of Earth. The sensor module 112 is configured to detect acceleration in each of the three axis directions relative to device 100.

Transfer of data or information from one device to another is needed for various purposes. Present invention enables data transfer from one device to another merely with the movement of any one or both the devices without requiring any other action from the user. FIGS. 2A-2D, 3A-3D, 4A-4D and 5A-5D illustrate some probable use-case scenarios with respect to the implementation of the present invention. In the present examples, at least one of the devices 102A and 102B has the capabilities of device 100 described above.

Figure 6:
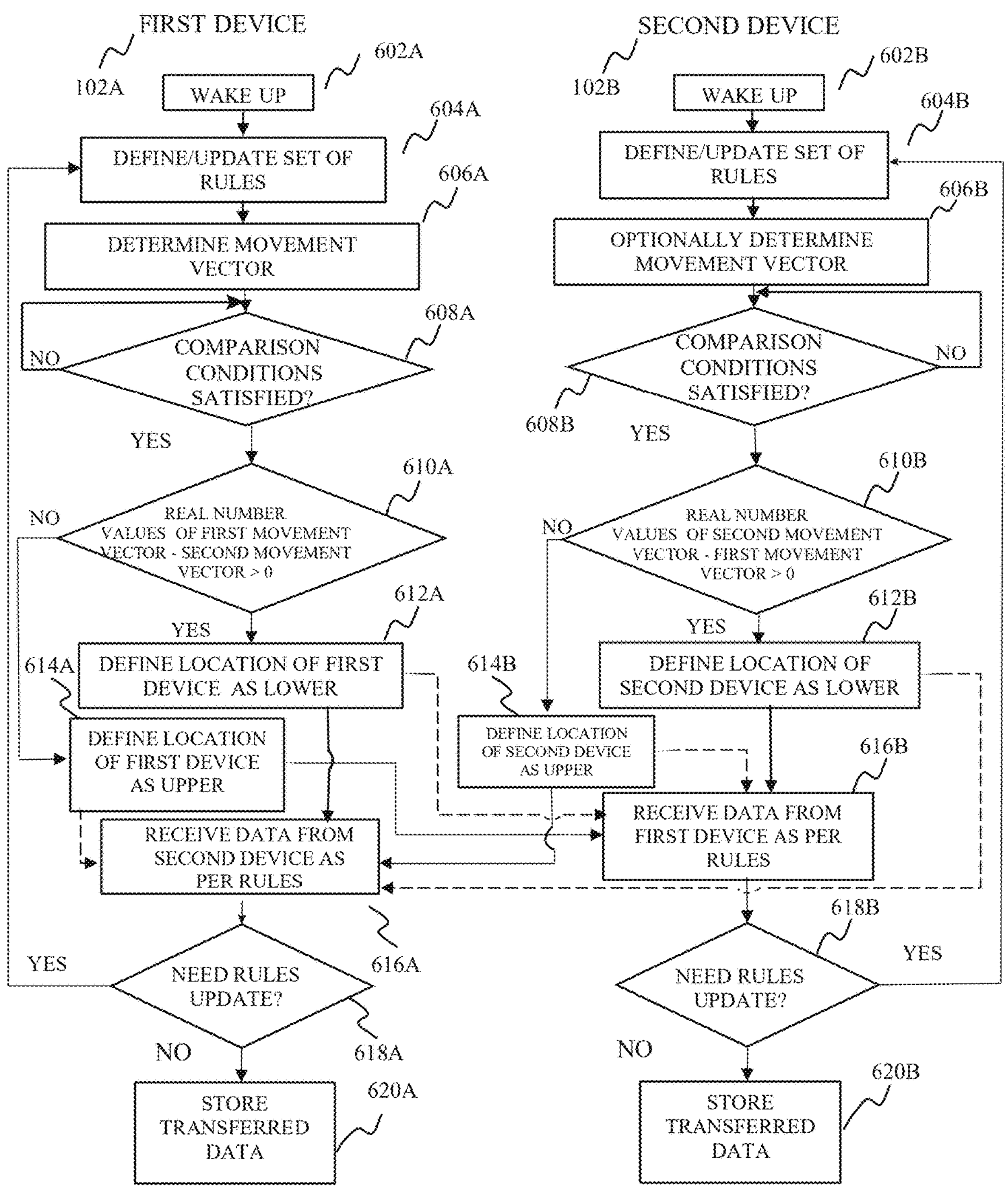
FIG. 6 is a flow diagram illustrating an exemplary process for the information transfer between the two devices in accordance with an embodiment of the present invention.

The computer executable instructions for the automated information transfer, which are already loaded into the devices 102A and 102B, are executed by the processor 105 for carrying out the steps shown in FIG. 6. The computer executable instructions may be downloaded and installed on the devices using methods known in the art.

As the present invention obviates the need to have a user interface or user inputs to carry out transfer of data from one device to another, it is essential that the devices already know how they have to behave when a physical movement is detected by them. Therefore, a set of rules is stored in memory 114 and updated as and when needed, for determining the actions to be taken by the device 102 with regard to transfer of data subsequent to detection of a physical movement. Some of the exemplary actions are listed in FIG. 7. For instance, if the latest rule instruction 702 says deletion of all the information 1 hour after last use, the receiving device performs that action once it receives data from an upper device. Again, for example, if the instruction 704 is to sleep for the next 6 hours after a download, the receiving device puts itself to sleep mode for the next 6 hours after receiving the data.

Figures 2A, 2B, 2C, 2D:
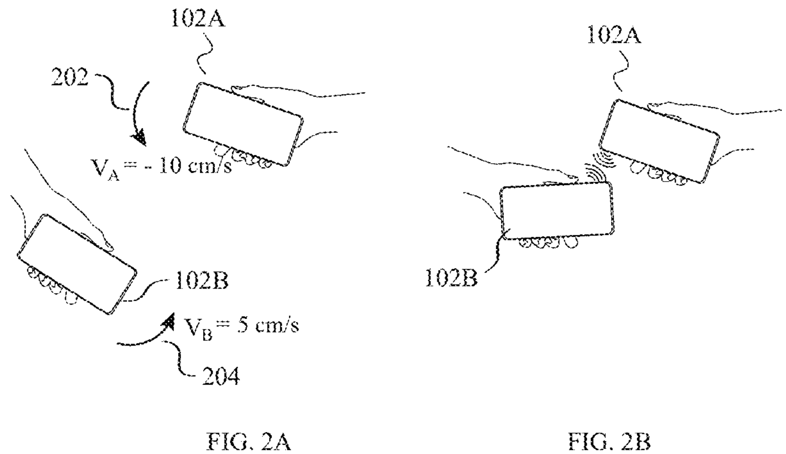
FIG. 2A illustrates an exemplary scenario of a first device moving downward in the direction of gravity with a speed greater than that of a second device moving upward opposite to the direction of gravity.
FIG. 2B illustrates an exemplary scenario of the first device communicating with the second device as a result of the movements shown in FIG. 2A in accordance with an embodiment of the present invention.
FIG. 2C illustrates an exemplary scenario of a first device moving downward in the direction of gravity with a speed lower than that of a second device moving upward opposite to the direction of gravity.
FIG. 2D illustrates an exemplary scenario of the first device communicating with the second device as a result of the movements shown in FIG. 2C in accordance with an embodiment of the present invention.

Reference to FIGS. 2A-2B, in the first example, device 102A, hereinafter referred to as first device 102A, is initially located above the device 102B, hereinafter referred to as second device 102B. The first device 102A is then made to move in the direction 202 downward towards the ground and the second device 102B is moved upward in the direction 204. Here, movement of 102A in the direction 202 is substantially along the direction of gravity and that of 102B is substantially opposite to the direction of gravity in the direction 204. The devices 102A and 102B are so configured that, as soon as any acceptable or detectable movements occur, the sensor module 112, which may optionally remain powered, detects it and wakes up the devices, as in steps 602A and 602B of FIG. 6, to initiate the method of the present invention. In some embodiment, the device is configured to remain "partially awake" for the sensor module to detect any predefined action or change is set parameters and use that detection to "fully awaken" the device. For example, only the proximity sensor may remain awake. In some other embodiments, the sensor module may detect a change, capture the energy caused by the change and use that energy to fully awake the device to trigger the startup process. Use of captured energy by an accelerometer resulting from a change in acceleration or by a photoelectric cell resulting from change in light to initiate the data transfer method are two examples of such embodiments.

After being woken up, the devices 102A and 102B look for action to be taken based on the set of rules already defined as in step 604A and 604B respectively. Since, a movement has been detected, in the present example, first device 102A determines the first movement vector corresponding to the movement made by itself in the direction 202 as in step 606A of FIG. 6. As for the second device 102B, it may (as in step 606B) or may not determine its own movement vector depending on the configuration of the second device 102B. For instance, if the second device 102B does not have the capability to measure its own movement vector, such as in case of a general desktop computer as shown in FIGS. 5A and 5B, the first device 102A may determine the second movement vector of the second device 102B by acquiring information on the movement (or lack of it) of the second device 102B from a distance with the help of systems such as LiDAR or the like. The movement vectors so acquired can be velocity vectors and/or acceleration vectors associated with the movement of the devices. In some embodiments, as soon as the devices detect a movement, they establish a wireless communication with each other with the help of technologies known in the art. In some embodiments, the devices 102A and the 102B also exchange information which may include information on their already defined respective set of rules.

The first device 102A and/or the second device 102B then determine, as in steps 608A and/or in 608B, as applicable, whether the movement vectors are to be compared or not based on one or more conditions. One of such conditions can be the closeness or proximity between the devices. For example, if both the devices move in the same direction as shown in FIGS. 4A and 4C and they move with such speeds/velocity that they do not come within a predefined proximity of each other under a predefined period of time, then their movement vectors are not compared. However, it may so happen that when the devices (or any one of them) begin their movements in opposite directions, they are already within that predefined proximity to each other. In such a case, even though the devices may move away from each other as they travel a distance, they may still try to compare their movement vectors with each other due to their movements. But, comparison of the movement vectors is not required in this scenario as the devices would eventually move away from each other. Therefore, the first/second device 102A/102B also takes into consideration the travel time for which the movements occur. For instance, if the first device 102A and the second device 102B are within a predefined proximity range of 10 centimeters when the movements begin and then they move away from each other and out of that proximity range of 10 centimeters in 1 second, then the devices would not proceed to carry out the movement vector comparison step. Thus, one of the conditions for movement vector comparison is continuation of the movement at least for a predefined period of time (which was 1 second in the above cited example).

To implement the present invention, the magnitude values of the movement vectors are assigned either a positive sign or a negative sign depending on the direction of the movements of the devices with respect to the direction of gravity (which is considered to be downward towards the center of the Earth). Execution of the computer readable instructions by the processor 105 configures the devices 102A and/or 102B for assigning the positive and negative sign values based on the feedback received from the sensor module 112.

In the present example, reference to FIG. 2A, the first device 102A is shown to move in the direction 202 downward at a velocity of 10 centimeters/second (cm/s) towards the ground and the second device 102B is shown to move upward in the direction 204 at a velocity of 5 cm/s. Accordingly, as per one embodiment of the present invention, the magnitude value of 10 cm/s of the first movement vector (velocity vector $V_A$ in the present example) is assigned a negative sign as the direction 202 of movement of the first device 102A is substantially in the direction of gravity. Accordingly, the signed magnitude value of the first movement vector $V_A$ in the present example is −10 cm/s. i.e., $V_A$=−10 cm/s. Similarly, the signed magnitude value of the second movement vector (velocity vector $V_B$ in the present example) having the magnitude value of 5 cm/s is +5 cm/s, i.e., $V_B$=5 cm/s as the second movement vector is assigned a positive sign due to the movement of the second device 102B being in a direction 204 substantially opposite to the direction of gravity. In other embodiments, this rule of assigning the positive and negative signs corresponding to a direction of movement can be reversed, i.e., a positive sign can be assigned for a movement in the direction of gravity and a negative sign can be assigned for a movement opposite to the direction of gravity.

Since, as discussed above, the magnitude value of a movement vector is assigned a negative or positive sign based on the direction of movement with respect to the direction of gravity, it is important that any movements occurring in a direction not substantially in line with the direction of gravity or opposite to the direction of gravity is not considered as a proper movement by the device(s) to initiate the process of data transfer. To this end, an angular zone 132 (as shown in FIG. 1B) having a predefined range of angle can be defined with reference to the direction of gravity 128. For example, if the predetermined range of the angular zone 132 is 45 degrees with respect to the direction of gravity 128 and the direction of the movement 202 of the device 102A as shown in FIG. 2A is 35 degrees with respect to the direction of gravity, then the device 102A accepts the movement 202 as a valid movement for further processing. Any movement in a direction falling outside the angular zone 132, in this example, is treated as an invalid movement for the data transfer to happen. This can be one of the conditions of step 608A and/or 608B of FIG. 6 to proceed further. One more optional condition required to be fulfilled for movement vector comparison can be such that the absolute value of the velocity vector of a movement should exceed a threshold/predefined velocity value. For example, if the threshold/predefined velocity value is set at 5 cm/sec then any movement of a device having a velocity value less than that in magnitude will be ignored by the device. In some embodiments, a physical contact between the devices as a result of movement of at least one of the devices can be one of the conditions for comparing the signed magnitude values of the movement vectors.

The above-mentioned conditions can be preset by a user in any combinations and, if those conditions are met with as in step(s) 608A and/or 608B, comparison of the signed magnitude values of the first and second movement vectors is carried out in steps 610(A) and/or 610(B). In the present example, the movement vectors $V_A$ and $V_B$ fulfill all the conditions, i.e., the devices were located beyond a predefined proximity range of 10 centimeters when their movements began and the movements continued for more than a predefined travel time of 1 second and their directions of movements are substantially along or opposite to the direction of gravity etc.

For comparisons, as in steps 610A and 610B, the real number values of the first and second movement vectors are considered. In the present example, the real number value of −10 cm/s of the first movement vector $V_A$ is accordingly compared with the real number value of +5 cm/s of the second movement vector ($V_B$). Positions of the devices as an above position and a below position with respect to each other along a substantially vertical axis parallel to the direction of gravity are defined based on the comparison between the real number values.

In accordance with one embodiment, in the present example, the position of the first device 102A is defined, as in step 614A (614B for device 102B), as above position (upper device) relative to the second device 102B as the real number value of the signed magnitude value of −10 cm/s corresponding to the first movement vector is found to be smaller than the real value of the signed magnitude value of 5 m/s corresponding to the second movement vector (real number value of −10 is less than +5). In the opposite case, i.e., if the real value of the signed magnitude value corresponding to the first movement vector is found to be greater than the real value of the signed magnitude value corresponding to the second movement vector, the location/position of the first device is defined, as in step 612A (612B for device 102B), as the below (lower device). This rule of defining a device having a real value of movement vector smaller than another device as an upper device is applied by the devices, as in the present example, when the signed magnitude value is assigned a negative sign for movements substantially along the direction of gravity and assigned a positive sign for movements substantially opposite to the direction of gravity. In some other embodiments, if the signed magnitude value is assigned a positive sign for the direction of movement substantially along the direction of gravity and a negative sign for the direction of movement substantially opposite to the direction of gravity, the relative positions of the devices are defined in the opposite way. If this rule of assigning a positive and negative sign in the reverse way is followed, the position of the first device will be defined as above position relative to the second device if the signed magnitude value corresponding to the first movement vector is found to be greater than the signed magnitude value corresponding to the second movement vector.

Once the relative positions of the devices are defined as above and below of each other, i.e., as upper and lower devices, the processor 105 executes the set of rules stored in the device memory 114 to configure at least one of the first and second devices to take one or more actions. One of the actions is wirelessly transmitting a set of data from one of the devices to the other based on their relative locations/positions in accordance with the set of rules without requiring any other action from the user(s). The direction of flow of the data can be from the upper device to the lower device (data flow direction is depicted with solid lines in FIG. 6) or from the lower device to the upper device (this alternate data flow direction is depicted with dotted/dashed lines in FIG. 6), as set in the rules, and the devices get automatically configured accordingly. For example, as per the predefined set of rules, the first device 102A can be configured to transfer the set of data from the first device 102A and the second device 102B is configured to receive the data if the position of the first device 102A has been defined as the above position as shown in FIG. 2B, i.e., first device 102A as the upper device relative to the second device 102B as in step 616B. Similarly, the second device 102B may transfer the set of data to the first device 102A if the position of the first device 102A is defined as the below position relative to the second device 102B as in step 616A. This direction of flow of data can be reversed, as per preference, to make the lower device (second device 102B is the lower device in the present example) send the data to the upper device (first device 102A is the upper device in the present example).

The one or more actions also include providing feedback by the devices on the status of data transmission. The status may comprise information on whether the movements of the devices fulfill the aforementioned conditions (minimum speed, minimum travel time, proximity and direction of travel etc.) or not, and, whether the data transmission/receipt was completely successful, partially successful or it failed etc.

In some embodiments, the received data may include one or more instructions to update the rules stored in the lower device. Thus, if any such rule update instructions are found in steps 618A and 618B for the first and second devices respectively, the set of rules stored in the devices gets updated. For example, a web page downloaded from an upper device to a lower device may include instructions (e.g., represented in Extensible Markup Language-XML) to update the set of rules existed in a lower device. Examples of rules received along with the set of data may include instructions for the lower/receiving device such as “do not accept any new data until told otherwise,” “resume default behavior,” “delete all information stored and then only save the latest item in memory,” “become inoperable for the next 12 hours” and the like. FIG. 7 illustrates some of the exemplary instructions transmitted by an upper device to a lower device to update the set of rules in the lower device. In case of a web page, for example, the web page might also contain a special code or a password so that only one specific lower/receiving device can implement the changes. Then, when the upper device downloads the information to the lower device those new rules can be implemented. In general, the data gets stored as in step 620A or in step 620B in the receiving device and, if required, the receiving device may take one or more actions based on the received data.

The selection of data by a device for transmission depends on the rules (already stored in the device or which have been updated corresponding to a received set of data). The set of rules may comprise a rule for selecting the set of data based on the type of the devices involved. For example, for the following types of devices, there are many possible sets of data to transfer; the rules enable the upper device to select which of these data to transmit.

- i. for a thermostat or a stove, the data to be transferred may include time and temperature settings
- ii. for a car, the data to be transferred may include information on seat position, desired temperature setting, favorite radio stations
- iii. for a piece of lab equipment, the data to be transferred may include machine settings The set of rules may also comprise a rule on selecting the set of data based on a type of the data available in the upper device, time of the physical movement of the device, and a relative location/position of the devices (upper or lower). In instances, where there are multiple types of data available for transfer, then the data selection is determined by that device being above or below. For example.

- i. For a printer, when below, the data to be received may include the last document stored for printing
- ii. For a printer, when above, the data to be transferred may include printer name and URL for a computer to use For some devices, there are many different types of data that could be transmitted or received. In these cases, the rules applicable will be not just only for the type of the data but also the time or sequence of the physical movements and the relative location of the device. Following are examples of such instances—

- a) When a computer is below i.e., a lower device, and the information is being sent to that computer from an upper device, then the upper device sends the last information it received from another device. For example:
  - i. If the device from which the intermediate device, i.e., the present upper device, received the last transmission was a printer, then the printer's name and URL will be transmitted to the computer from the intermediate device.
  - ii. But, if the device from which the intermediate device i.e., the present upper device received the last transmission was also a computer (a Word document from a desktop, for example), then the intermediate device will transmit the relevant data (the data related to the Word document in the present example) and not the identification information.
- b) When a computer is above, and the information is being sent from the computer to the lower device, then the information displayed in the computer's active window is downloaded. The relevant rules in this case for the upper device with regard to data transfer may include the following:
  - i. If a computer's active window is a Microsoft application (e.g., Word, Excel, Outlook) then that document (all of it in Word, the specific tab in Excel, the specific message in Outlook, for example) is transmitted.
  - ii. Otherwise, if a computer's active window is a web browser, then
    1. The web page and its URL are downloaded.
    2. If there is any TAP-XML (an instantiation of XML using a schema designed for the present invention for information transfer) code in the web page then, in addition to the web page and URL being transmitted the TAP-XML instructions are followed i.e., the rules get updated and the updated rules are subsequently followed. In some embodiments, a page on display (a webpage to be downloaded to a lower device, for example) on an upper device may be configured to present a form to receive a user input indicative of a request to define/edit the rules. If there are multiple TAP-XML constructs in a single web page, then all of them are followed. For example,
  - i. Example 1—first construct instructs the receiving device to sleep for 6 hours (as indicated by 704 in FIG. 7).
  - ii. Example 2—second construct instructs the receiving device to delete any URL information currently stored on the device
  - iii. Example 3—third construct changes the rules on the receiving device: the receiving device will no longer receive and store URL information As can be seen in the exemplary implementation of the present invention described above, to make the data transfer occur in a desired direction, it just needs the physical movement of at least one of the devices substantially in or opposite to the direction of gravity. Apart from moving one of the devices no other user input is required to complete the data transfer process. In fact, in some embodiments, a device devoid of any user interface can be custom made incorporating the present invention and would still work the same intended way.

Use case A: Put an air conditioner instantly at the same settings as that of another air conditioner.

Steps to be followed by a user—

1. Install the app of the present invention on a cell/mobile phone
2. Walk to thermostat of an air conditioning system of a room
3. Move the cell phone upward and toward the bottom of thermostat Effect: The thermostat (upper device) downloads information (times and temperatures) to the cell phone (lower device)
4. Walk to thermostat of another room
5. Move the cell phone downward and toward the thermostat Effect: The cell phone (upper device) downloads information (times and temperatures) to that thermostat (lower device)
6. Walk to the thermostat in someone else's home
7. Move the cell phone downward and toward the thermostat with the cell phone Effect: The cell phone (upper device) downloads information (times and temperatures) to that thermostat (lower device)
8. Drive to a hotel and stay in a room with a present invention incorporated thermostat. To set the temperature to the home setting, move the cell phone downward and toward the top of the hotel thermostat Effect: The cell phone downloads information (times and temperatures) to the hotel thermostat.

Use case B: Instantly set a toaster oven for a desired recipe.

Steps to be followed by a user—

1. Take a mobile phone which has the present invention implemented in it
2. Walk to the computer showing a recipe from a web site
3. Move the cell/mobile phone upward and toward the bottom of the computer.

From the website shown, the only thing that makes sense to download are the entire web page and, via TAP-XML encoding, for example, the cooking time and temperature.

Effect: The computer downloads both the entire web page and the content (cooking time and temperature) to the mobile phone
4. Walk to a toaster oven
5. Move the cell phone downward and toward the top of a toaster oven Effect: The mobile phone downloads information (cooking time and temperature) and starts the cooking cycle Use case C: Instantly set car configurations.

Steps to be followed by a user—

1. Use an intermediary device (a wearable device, for example) having the capabilities of device 100.
2. Walk to the car which has the desired configuration
3. Move the intermediary device upward and toward the bottom of the car's dash Effect: The car downloads information (e.g., seat position, radio station settings, temperature and fan settings) to the intermediary device
4. Walk to another car
5. Move the intermediary device downward and toward the top of the new car's dash.

Effect: The intermediary device downloads the recorded car information
6. Drive to a friend's house, walk up to their thermostat, and move the intermediary device downward and toward the top of their thermostat. The intermediary device downloads the information that been stored previously in use case A.

It is to be noted that the intermediary device simultaneously and persistently holds information from multiple contexts.

Use case D: Instantly set equipment configurations.

An experiment to be carried out in a chemistry lab involves programing a variety of machines (e.g., one machine may have 50 heating and cooling cycles, for different lengths of time with different temperatures) and the description on how to perform the experiment is found on the internet. If the present invention is not implemented then a user had to learn the user interface of each piece of equipment, copy the experiment's information from the web and then enter the information into each piece of equipment using their user interfaces to complete the experiment. But, with the present invention implemented in each piece of equipment and in the computer, the user has to follow just the following steps to get the experiment done.

1. Put on the wearable device or take the mobile device
2. Move the wearable device upward and toward the bottom of the computer which is displaying the required information or which has the required information.

Effect: The wearable device now "holds" relevant information for all the equipment
3. Go to each piece of equipment and move the wearable device downward and toward the top of that equipment.

Effect: Each piece of equipment gets the required information to perform the test.

In the present example, reference to FIGS. 2A and 2B, the first device 102A and the second device 102B move toward each other, i.e., device 102A moves downward with a speed greater than of the second device 102B which moves upward against the direction of gravity. There can be many other instances in which the initial position of the devices, magnitude of the movements (or lack of that) and the direction of movements of the devices would be different from those cited in the examples. FIGS. 2C-2D, 3A-3D, 4A-4D and 5A-5D illustrates some of such probable scenarios.

As illustrated in FIG. 2C, in one of the exemplary scenarios, the first device 102A is moved downward towards the second device 102B which is moved upward. The first device 102A and the second device 10B are moved with velocities of −5 cm/s and 10 cm/s respectively. When compared by the device(s), it is found that the real number value of the movement vector of 10 m/s of the second device 102B is greater than that of the first movement vector of −5 m/s. Therefore, the device(s) determines that the second device 102B, for having the greater movement vector than the first device 102A, is the lower device and the first device 102A is the upper device relative to each other. Data transfer occurs automatically from the upper device to the lower device (as in FIG. 2D) or from the lower device to the upper device as per preset rules.

In both of the exemplary scenarios discussed above with reference to FIGS. 2A-2D, the first device 102A is initially located above the second device 102B and then they are moved toward each other. In the next exemplary scenarios illustrated in FIGS. 3A-3D, the second device 102B is located above the first device 102A before the devices are moved. In the example of FIGS. 3A-3B, the second device 102B is moved downward at a velocity of −5 cm/s whereas the first device 102A is moved upward at a velocity of 10 cm/s. Comparison of the movement vectors shows that the real number values of −5 cm/s is smaller than the real number value of 10 cm/s. Accordingly, in one embodiment, reference to FIG. 3B, the second device 102B having the smaller real number value of signed magnitude value compared to the first device 102A is defined as the upper device and the first device 102A as the lower device. In the next example depicted in FIGS. 3C-3D, the second device 102B is initially located the first device 102A and then the second device 102B is moved downward with a higher movement vector (−10 cm/s) than the first device 102A which is being moved in the upward direction at 5 cm/s. Here also, the devices find on comparison that the real number value of 5 cm/s of the first device's movement vector is greater than that of second device's signed magnitude value of −10 cm/s and, accordingly, reference to FIG. 3D, the second device 102A is defined as the upper device and the first device 102A as the lower device.

The examples discussed herein so far covers situations when the devices are moved towards each other. FIGS. 4A-4D illustrate situations wherein both the devices are moved in the same direction. In the first example of such scenarios, shown in FIGS. 4A-4B, the second device 102B is initially located above the first device 102A before they are moved in the same upward direction opposite to the direction of gravity with signed magnitude values of 5 cm/s and 10 cm/s respectively. The real number value of the movement vector 5 cm/s of the second device is smaller than 10 cm/s movement vector of the first device. Therefore, reference to FIG. 4B, the second device 102B having the smaller real number value between the two movement vectors is defined as the upper device and, hence, the first device 102A as the lower device. In the other example shown in FIG. 4C-4D, the second device 102B is located above the first device 102A prior to the movements and then both are moved in the direction of gravity with movement vectors of −10 cm/s and −5 cm/s respectively. In this case the real number value of signed magnitude −5 cm/s is greater than the −10 cm/s signed magnitude value of the first device 102A. Accordingly, reference to FIG. 4D, the second device 102B having the smaller real number value of the movement vectors is defined as the upper device. In both these examples, if the devices gradually move away from other while moving in the same direction then the conditions for fulfilling the movement vector comparison will not be met at steps 608A and/or 608B and data transfer would not happen.

The present invention works even when only one of the devices moves and the other device either remains stationary or its direction of movement does not fall within the angular zone 132 (as shown in FIG. 1B) defined with reference to the direction of gravity. In the example of FIGS. 5A-5B, the first device 102A is initially located below the second device 102B and then moved with a signed magnitude value of 10 cm/s in the upward direction toward the second device 102B which is stationary (value of movement vector is zero). As the real number value of the movement vector 10 cm/s of the first device 102A is greater than the zero-movement vector, reference to FIG. 5B, the first device 102A is defined as the lower device and the stationary second device 102B as the upper device. In the second example, as shown in FIGS. 5C-5D, initially the first device 102A is located below the second device 102B. The second device 102B is then moved with a signed magnitude value of −10 cm/s, i.e., in the downward direction, toward the stationary first device 102A. Again, as the magnitude of the movement vector for the stationary first device 102A is zero, the real number value (−10) of the second device's movement vector −10 cm/s is smaller than that. Accordingly, reference to FIG. 5D, the system defines the second device 102B as the upper device for having a smaller real value number between the movement vectors of the first and second devices.

If the two devices move away from each other during the course of travel, then their corresponding movement vectors would not fulfill the proximity condition described above and, hence, no data transfer will occur. Status report in such a case will be generated describing the failure to transfer data. Even if the devices were located close to each other fulfilling the proximity condition before they are moved, they are likely to go out of the predefined proximity range in the predefined travel time when they move away resulting in failure to meet the other condition which requires the devices to be in the proximity range after the minimum travel time.

The present invention can also be utilized to determine relative location and, thus, initiate data transfer from one device to another in a desired direction even when none of the devices involved in the data transfer process has the complete capability of the device 100 described above. In these cases, a third device having the capabilities of device 100 can be used to carry out some of the steps of FIG. 6 to complete the data transfer process. FIG. 5E illustrates such an application wherein a third device 102C having the capabilities of device 100 described above is used to determine and/or compare the movement vectors of the devices 502 and 504 which do not necessarily have all the capabilities of device 100. Here, for example, device 102C may acquire the movement related data of the devices 502 and 504 from a distance using methods such as Light Detection and Ranging (LiDAR) etc. Device 102C may then further compare the movement vectors, define the relative positions of the devices 502 and 504 and inform them to initiate the data transfer process from the upper to lower or from lower to upper device, as desired.

Flowcharts are used to describe the steps of the present invention. While the various steps in this flowchart are presented and described sequentially, some or all of the steps may be executed in different orders, may be combined or omitted, and some or all of the steps may be executed in parallel. Further, in one or more of the embodiments of the invention, one or more of the steps described above may be omitted, repeated, and/or performed in a different order. In addition, additional steps, omitted in the flowchart may be included in performing this method. Accordingly, the specific arrangement of steps shown in FIG. 6 should not be construed as limiting the scope of the invention.

The invention claimed is:

1. A method for automated information transfer, said method comprising:

determining a signed magnitude value of a first movement vector and a second movement vector corresponding to a movement of a first device and a second device respectively, each of said signed magnitude values is being assigned a positive sign or a negative sign based on a direction of said movement with respect to a direction of gravity;

comparing said signed magnitude values of said first movement vector and said second movement vector on fulfillment of one or more conditions; and defining a position of said first device as an above position or a below position located relative to said second device based on said comparison.

2. The method of claim 1, wherein said movement vector is a velocity vector or an acceleration vector.

3. The method of claim 1, wherein said position of said first device is defined as said above position relative to said second device if said signed magnitude value corresponding to said first movement vector is found to be smaller than said signed magnitude value corresponding to said second movement vector, said signed magnitude value being assigned said negative sign when said direction of said movement is substantially along said direction of gravity and assigned said positive sign when said direction of said movement is substantially opposite to said direction of gravity.

4. The method of claim 1, wherein said position of said first device is defined as said above position relative to said second device if said signed magnitude value corresponding to said first movement vector is found to be greater than said signed magnitude value corresponding to said second movement vector, said signed magnitude value being assigned said positive sign when said direction of said movement is substantially along said direction of gravity and assigned said negative sign when said direction of said movement is substantially opposite to said direction of gravity.

5. The method of claim 1, wherein said one or more conditions include a predefined proximity between said first device and said second device.

6. The method of claim 1, wherein said one or more conditions include continuation of said movement at least for a predefined period of time.

7. The method as in claim 1, wherein an angular zone having a predetermined range of angle is defined with reference to said direction of gravity, said direction of said movement falling within said angular zone is being one of said one or more conditions.

8. The method of claim 1, wherein said one or more conditions include an absolute value of at least said first movement vector or said second movement vector exceeding a predefined threshold.

9. The method of claim 1, wherein said comparison is done between real number values of said signed magnitude values.

10. The method of claim 1, wherein said one or more conditions include a physical contact between said first device and said second.

11. The method of claim 1, wherein at least one of said first and second devices comprises at least one processor and a non-transitory machine-readable storage medium having a set of data and a set of rules stored therein which, when executed by said at least one processor, configures said at least one of said first and second devices to take one or more actions.

12. The method of claim 11, wherein said one or more actions include wirelessly transmitting said set of data in accordance with said set of rules from said first device to said second device if said position of said first device is defined as said above position relative to said second device or from said second device to said first device if said position of said first device is defined as said below position relative to said second.

13. The method of claim 11, wherein said one or more actions include wirelessly transmitting said set of data in accordance with said set of rules from said second device to said first device if said position of said first device is defined as said above position relative to said second device or from said first device to said second device if said position of said first device is defined as said below position relative to said second device.

14. The method of claim 11, wherein said set of rules is updated in said first device or in said second device upon receiving said set of data from said second device or from said first device respectively.

15. The method of claim 11, wherein said one or more actions include providing a feedback by said first device or by said second device with respect to a status on receiving or transmitting said set of data.

16. The method of claim 11, wherein said first device and said second device are configured to wake up said at least one processor for determining said signed magnitude value in response to a wake up action.

17. The method of claim 1, wherein said at least of one of said first device and said second device or a third device is configured for said determination of said signed magnitude values of said first movement vector and of said second movement vector.

18. The method of claim 17, wherein said at least one of said first device and said second device or said third device is configured for said comparison of said signed magnitude values.

* * * * *